(12) United States Patent
Hikichi et al.

(10) Patent No.: US 9,891,003 B2
(45) Date of Patent: Feb. 13, 2018

(54) COMBINED HEAT AND POWER SYSTEM

(71) Applicant: Panasonic Intellectual Property Management Co., Ltd., Osaka-shi, Osaka (JP)

(72) Inventors: Takumi Hikichi, Osaka (JP); Osao Kido, Kyoto (JP); Atsuo Okaichi, Osaka (JP); Osamu Kosuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 154 days.

(21) Appl. No.: 14/936,174

(22) Filed: Nov. 9, 2015

(65) Prior Publication Data

US 2016/0061530 A1  Mar. 3, 2016

Related U.S. Application Data

(63) Continuation of application No. PCT/JP2014/002132, filed on Apr. 15, 2014.

(30) Foreign Application Priority Data

May 17, 2013 (JP) .................................. 2013-104902

(51) Int. Cl.
*F28D 7/00* (2006.01)
*F01K 25/08* (2006.01)
(Continued)

(52) U.S. Cl.
CPC ............ *F28D 7/0008* (2013.01); *F01K 25/08* (2013.01); *F22B 1/18* (2013.01); *F28F 27/00* (2013.01); *Y02E 20/14* (2013.01)

(58) Field of Classification Search
CPC ........ F28D 7/0008; F28F 27/00; F01K 25/08; F22B 1/18; Y02E 20/14
(Continued)

(56) References Cited

U.S. PATENT DOCUMENTS 3,127,744 A * 4/1964 Nettel ................... F01K 23/103
                                                    60/39.182
4,253,300 A * 3/1981 Willyoung ............ F01K 23/061
                                                    60/39.182
(Continued)

FOREIGN PATENT DOCUMENTS

DE    10 2007 060666    6/2009
EP         2 014 880    1/2009
(Continued)

OTHER PUBLICATIONS

International Search Report issued in International Application No. PCT/JP2014/002132, dated Jul. 15, 2014, 4 pages.
(Continued)

*Primary Examiner* — Hoang Nguyen
(74) *Attorney, Agent, or Firm* — Hamre, Schumann, Mueller & Larson, P.C.

(57) ABSTRACT

A CHP system includes a combustor as a heat source, a Rankine cycle apparatus, a second heat exchanger, and a thermal fluid flow path. The Rankine cycle apparatus includes, as an evaporator, a first heat exchanger that absorbs thermal energy from combustion gas (thermal fluid). The second heat exchanger absorbs thermal energy from the combustion gas and transfers the thermal energy to a heat medium. The first heat exchanger and the second heat exchanger are disposed in the thermal fluid flow path. The thermal fluid flow path includes a first flow path that allows the combustion gas to reach the first heat exchanger directly from the combustor and a second flow path that allows the
(Continued)

combustion gas to reach the second heat exchanger directly from the combustor.

15 Claims, 9 Drawing Sheets

(51) Int. Cl.
 *F22B 1/18* (2006.01)
 *F28F 27/00* (2006.01)
(58) Field of Classification Search
 USPC .............................. 60/651, 655, 671, 39.182
 See application file for complete search history.

(56) References Cited

U.S. PATENT DOCUMENTS

| | | | | |
|---|---|---|---|---|
| 4,468,923 A | * | 9/1984 | Jorzyk | ................... F01K 23/061 60/39.182 |
| 4,479,355 A | * | 10/1984 | Guide | ..................... F01K 23/06 60/655 |
| 4,628,462 A | * | 12/1986 | Putman | ................... F01K 17/02 60/660 |
| 5,241,825 A | * | 9/1993 | Collin | ................... F01K 23/061 60/39.182 |
| 2010/0281865 A1 | * | 11/2010 | Lehar | ..................... F01K 25/08 60/671 |
| 2011/0101119 A1 | * | 5/2011 | Schilling | ................... F01K 3/00 237/12.1 |

FOREIGN PATENT DOCUMENTS

| | | |
|---|---|---|
| JP | 57-021701 | 2/1982 |
| JP | 61-289201 | 12/1986 |
| JP | 62-184107 U | 11/1987 |
| JP | 1-240707 | 9/1989 |
| JP | 1-318802 | 12/1989 |
| JP | 4-043802 | 2/1992 |
| JP | 2006-250081 | 9/2006 |
| JP | 2007-298244 | 11/2007 |
| JP | 2009-103344 | 5/2009 |
| JP | 4296200 B | 7/2009 |
| JP | 2012-149541 | 8/2012 |

OTHER PUBLICATIONS

Extended European Search Report issued in corresponding European Patent Application No. 14797383.8, dated Apr. 5, 2016, 7 pages.

* cited by examiner

COMBINED HEAT AND POWER SYSTEM

This is a continuation of International Application No. PCT/JP2014/002132, with an international filing date of Apr. 15, 2014, which claims the foreign priority of Japanese Patent Application No. 2013-104902, filed on May 17, 2013, the entire contents of both of which are hereby incorporated by reference.

BACKGROUND OF THE INVENTION

1. Field of the Invention

The present disclosure relates to combined heat and power systems.

2. Description of Related Art

A combined heat and power system (CHP system) is a system configured to create several forms of energy such as heat and electricity simultaneously from a single or plurality of sources. In recent years, not only large-scale CHP systems but also CHP systems installable in relatively small-scale facilities such as hospitals, schools, and libraries and CHP systems for use in ordinary houses (so-called micro CHPs) have been receiving attention.

EP 2014880 A1 describes a CHP system configured to create electricity using combustion gas produced in a gas boiler or a pellet boiler as thermal energy for a Rankine cycle apparatus. In the CHP system of EP 2014880 A1, an evaporator of the Rankine cycle apparatus is located closer to a heat source than is a heat exchanger for producing hot water; that is, the evaporator is located on the upstream side of a flow path of the combustion gas. With this configuration, thermal input to the evaporator is increased, and the rotary power of an expander of the Rankine cycle apparatus is increased, in consequence of which increased electricity is obtained.

SUMMARY OF THE INVENTION

Whether a conventional CHP system can stably supply hot water or not depends on the operating conditions of a Rankine cycle apparatus. For example, in a transition period such as a short period immediately after the start of the operation of the Rankine cycle apparatus, the supply of hot water is unstable. When the operation of the Rankine cycle apparatus is stopped due to defects including failure of devices such as an expander and a pump and leakage of a working fluid, it is difficult to supply hot water.

One non-limiting and exemplary embodiment of the present disclosure provides a CHP system capable of stably supplying thermal energy.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a combined heat and power system including:

a heat source;

a Rankine cycle apparatus including, as an evaporator for heating a working fluid, a first heat exchanger that absorbs thermal energy from a thermal fluid produced in the heat source;

a second heat exchanger, as a heat exchanger for heating a heat medium different from the working fluid of the Rankine cycle apparatus, that absorbs thermal energy from the thermal fluid and transfers the thermal energy to the heat medium; and a thermal fluid flow path in which the first heat exchanger and the second heat exchanger are disposed so that the thermal fluid is supplied from the heat source to the first heat exchanger and the second heat exchanger respectively.

The thermal fluid flow path includes a first flow path that allows the thermal fluid to reach the first heat exchanger directly from the heat source and a second flow path that allows the thermal fluid to reach the second heat exchanger directly from the heat source.

The above-described CHP system can supply thermal energy stably.

These general and specific aspects may be implemented using a system, a method, and a computer program, and any combination of systems, methods, and computer programs.

DETAILED DESCRIPTION

Figure 1:
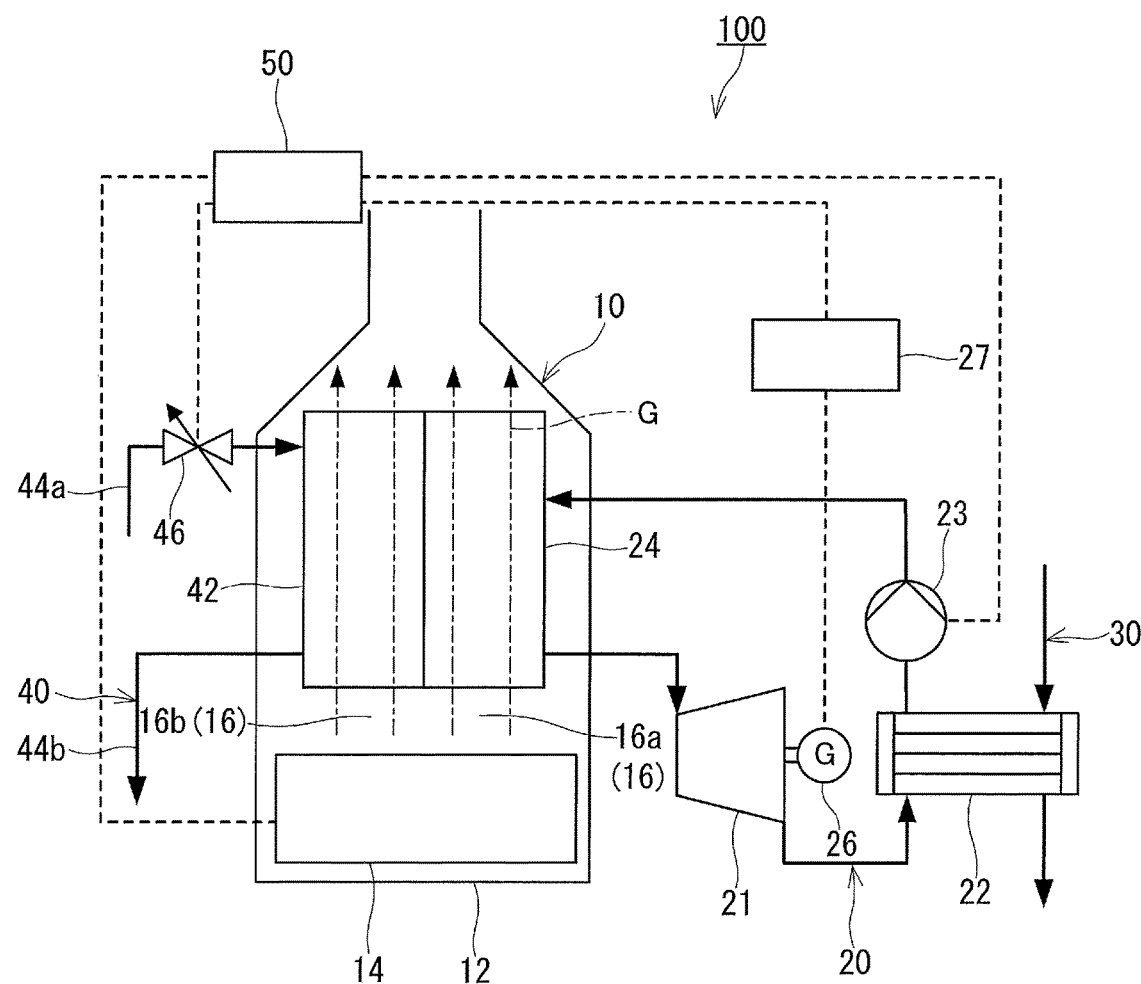
FIG. 1 is a configuration diagram of a combined heat and power system according to an embodiment of the present disclosure.

The CHP system described in EP 2014880 A1 converts a portion of the thermal energy produced in the heat source which has not been absorbed in the evaporator of the Rankine cycle apparatus and a portion of the thermal energy produced in the heat source which has been released by the working fluid in the condenser of the Rankine cycle apparatus into hot water to supply the hot water. That is, the CHP system described in EP 2014880 A1 is a system for producing hot water using waste heat from the Rankine cycle apparatus. In such a CHP system, the amount of produced hot water varies depending on the operating conditions of the Rankine cycle apparatus. Specifically, the CHP system cannot supply hot water when the Rankine cycle apparatus is not in operation. If the fuel is combusted in the boiler to supply combustion gas to the heat exchanger for producing hot water when the Rankine cycle apparatus is not in operation, the evaporator of the Rankine cycle apparatus is excessively heated. As a result, defects, such as thermal damage to the evaporator, thermal decomposition of the working fluid, and thermal decomposition of the lubricating oil, may occur.

In the case of the conventional CHP system, therefore, the entire system needs to be shut down when the operation of the Rankine cycle apparatus is stopped. When the amount of combustion gas produced in the boiler is reduced to reduce the temperature of the combustion gas to a level low enough to prevent the defects of the Rankine cycle apparatus, the temperature of the combustion gas in the heat exchanger is too low to produce hot water. As a result, the amount of supplied hot water decreases extremely and thus the temperature of the supplied hot water also decreases. Since the ratio of heat loss caused by the release of heat to the surroundings increases, the efficiency of energy conversion also decreases.

In view of the above circumstances, a first aspect of the present disclosure provides a combined heat and power system including:

a heat source;

a Rankine cycle apparatus including, as an evaporator for heating a working fluid, a first heat exchanger that absorbs thermal energy from a thermal fluid produced in the heat source;

a second heat exchanger, as a heat exchanger for heating a heat medium different from the working fluid of the Rankine cycle apparatus, that absorbs thermal energy from the thermal fluid and transfers the thermal energy to the heat medium; and a thermal fluid flow path in which the first heat exchanger and the second heat exchanger are disposed so that the thermal fluid is supplied from the heat source to the first heat exchanger and the second heat exchanger respectively, wherein the thermal fluid flow path includes a first flow path that allows the thermal fluid to reach the first heat exchanger directly from the heat source and a second flow path that allows the thermal fluid to reach the second heat exchanger directly from the heat source.

According to the combined heat and power system of the first aspect, the thermal fluid produced in the heat source reaches the evaporator (first heat exchanger) of the Rankine cycle apparatus directly from the heat source through the first flow path. The thermal fluid also reaches the second heat exchanger directly from the heat source through the second flow path. Therefore, it is easy to maintain the thermal energy input to the second heat exchanger constant, regardless of the operation state of the Rankine cycle apparatus. As a result, it is possible to supply the thermal energy stably.

A second aspect of the present disclosure provides the combined heat and power system according to the first aspect, wherein the first flow path is formed by a space between the heat source and the first heat exchanger, and the first heat exchanger directly faces the heat source across the first flow path, and the second flow path is formed by a space between the heat source and the second heat exchanger, and the second heat exchanger directly faces the heat source across the second flow path. With such a configuration, the combustion gas can reach the first heat exchanger and the second heat exchanger respectively while maintaining its high flow speed. Therefore, the heat transfer coefficients on the surface of the first heat exchanger and on the surface of the second heat exchanger are improved and high efficiency of heat exchange can be achieved. In addition, the second heat exchanger is not present between the heat source and the first heat exchanger, and the first heat exchanger is not present between the heat source and the second heat exchanger. Therefore, as long as a certain amount of thermal energy is produced in the heat source, the first heat exchanger and the second heat exchanger can each receive the thermal energy stably.

A third aspect of the present disclosure provides the combined heat and power system according to the first or second aspect, wherein when the first heat exchanger and the second heat exchanger are orthogonally projected onto a plane of projection perpendicular to a flow direction of the thermal fluid in the thermal fluid flow path, a projected image of the first heat exchanger and a projected image of the second heat exchanger do not overlap each other on the plane of projection. When the first heat exchanger and the second heat exchanger are in this positional relationship, the effects based on the first or second aspect can be ensured.

A fourth aspect of the present disclosure provides the combined heat and power system according to any one of the first to third aspects, wherein the thermal fluid can reach the second heat exchanger from the heat source without passing through the first heat exchanger, and the thermal fluid can reach the first heat exchanger from the heat source without passing through the second heat exchanger. With such a configuration, the effect based on the first to third aspects can be ensured.

A fifth aspect of the present disclosure provides the combined heat and power system according to any one of the first to fourth aspects, wherein the second heat exchanger is in direct contact with the first heat exchanger or is in indirect contact with the first heat exchanger via a thermally-conductive member. When the second heat exchanger is in direct contact with the evaporator (first heat exchanger) of the Rankine cycle apparatus or is in indirect contact with the evaporator via the thermally-conductive member, heat of the evaporator is transferred to the second heat exchanger even if the operation of the Rankine cycle apparatus is stopped. As a result, it is possible not only to supply the thermal energy to the outside even if the Rankine cycle apparatus is not in operation but also to efficiently increase the amount of the thermal energy supplied from the system to the outside. Furthermore, it is possible to prevent defects such as thermal damage to the evaporator and thermal decomposition of the working fluid of the Rankine cycle apparatus.

A sixth aspect of the present disclosure provides the combined heat and power system according to any one of the first to fifth aspects, wherein the heat source includes a plurality of discrete heat sources capable of producing the thermal fluid independently of each other, and at least one of the discrete heat sources can supply the thermal fluid substantially only to the second heat exchanger. With such a configuration, it is possible to heat the heat medium stably in the second heat exchanger, regardless of the operation state of the Rankine cycle apparatus. Furthermore, it is possible, when the Rankine cycle apparatus is not in operation, to heat the heat medium in the second heat exchanger depending on the amount of the thermal energy required, while further ensuring the prevention of defects such as thermal damage to the first heat exchanger.

A seventh aspect of the present disclosure provides the combined heat and power system according to the sixth aspect, wherein a partition is provided between the first heat exchanger and the second heat exchanger. With this partition, the thermal fluid flow path can be partitioned into a portion where the first heat exchanger is disposed and a portion where the second heat exchanger is disposed. As a result, the thermal fluid can be supplied from the discrete heat sources to the first heat exchanger and the second heat exchanger respectively. The partition can prevent the thermal fluid from being supplied to the first heat exchanger while the thermal fluid is being supplied to the second heat exchanger. Accordingly, it is possible, when the Rankine cycle apparatus is not in operation, to produce hot water in the second heat exchanger while further ensuring the prevention of defects such as thermal damage to the first heat exchanger.

An eighth aspect of the present disclosure provides the combined heat and power system according to any one of the first to seventh aspects, wherein the heat source is a combustor that produces flame and combustion gas as the thermal fluid, and the thermal fluid flow path is formed by an internal space of a combustion chamber containing the combustor. With the use of the combustor that produces flame and combustion gas as the heat source, high-temperature thermal energy can easily be obtained. As a result, it is possible to improve the efficiency of electricity generation by the Rankine cycle apparatus. It is further possible to reduce the size of the first heat exchanger and the second heat exchanger.

A ninth aspect of the present disclosure provides the combined heat and power system according to any one of the first to eighth aspects, further including: a flow path connected to the second heat exchanger so as to feed the heat medium to the second heat exchanger; and a flow rate regulator disposed in the flow path. The amount of the heat medium flowing through the second heat exchanger can be regulated by controlling the flow rate regulator. That is, it is possible not only to regulate the amount of the heat medium to be heated on demand, but also to adjust the ratio of the thermal output (kWt) to the electrical output (kWe) to an optimal range.

A tenth aspect of the present disclosure provides the combined heat and power system according to the ninth aspect, wherein the Rankine cycle apparatus includes a detector that detects an amount of generated electricity, and the combined heat and power system further includes a controller that controls the flow rate regulator based on the amount of generated electricity detected by the detector. With such a configuration, the electrical output and the thermal output can be freely and finely adjusted on demand.

An eleventh aspect of the present disclosure provides the combined heat and power system according to any one of the first to tenth aspects, wherein the combined heat and power system is capable of heating the heat medium by feeding the heat medium to the second heat exchanger when the Rankine cycle apparatus is not generating electricity. With such a configuration, it is possible to supply the heat medium heated in the second heat exchanger to the outside when only the thermal energy is needed, thereby improving the convenience for users.

A twelfth aspect of the present disclosure provides the combined heat and power system according to any one of the first to eleventh aspects, further including a third heat exchanger located farther from the heat source than are the first heat exchanger and the second heat exchanger, wherein the third heat exchanger transfers the thermal energy of the thermal fluid to the heat medium. With the use of the third heat exchanger, the remaining portion of the thermal energy produced in the heat source which has not been absorbed in the first heat exchanger and the second heat exchanger can be recovered. As a result, the efficiency of use of the thermal energy produced in the heat source is improved.

A thirteenth aspect of the present disclosure provides the combined heat and power system according to the twelfth aspect, wherein the third heat exchanger is connected to the second heat exchanger so that the heat medium having passed through the third heat exchanger flows into the second heat exchanger. With such a configuration, water with a relatively low temperature flows through the third heat exchanger, while water with a relatively high temperature flows through the second heat exchanger. Therefore, a larger amount of thermal energy can be absorbed in the second heat exchanger and the third heat exchanger. As a result, the efficiency of use of the thermal energy produced in the heat source is improved.

A fourteenth aspect of the present disclosure provides the combined heat and power system according to the fifth aspect, wherein the thermally-conductive member is a heat pipe that allows the first heat exchanger and the second heat exchanger to be in indirect contact with each other. With the use of the heat pipe, heat transfer from the first heat exchanger to the second heat exchanger can be facilitated.

Hereinafter, embodiments of the present disclosure will be described with reference to the drawings. It should be noted that the present disclosure is not limited by the embodiments described hereinafter.

As shown in FIG. 1, a combined heat and power system (hereinafter referred to as a "CHP system") 100 of the present embodiment includes a boiler 10, a Rankine cycle apparatus 20, a first fluid circuit 30, a second fluid circuit 40, and a controller 50. The CHP system 100 is configured to create hot water and electricity simultaneously or separately using thermal energy produced in the boiler 10. The word "simultaneously" is used to mean that electricity can be supplied while hot water is supplied. The word "separately" is used to mean that electricity alone can be supplied while supply of hot water is stopped, and hot water alone can be supplied while supply of electricity is stopped.

When the Rankine cycle apparatus 20 is in operation, electricity produced in the Rankine cycle apparatus 20, hot water produced in the first fluid circuit 30, and hot water produced in the second fluid circuit 40 can be supplied to the outside. When the Rankine cycle apparatus 20 is not in operation, hot water produced in the second fluid circuit 40 can be supplied to the outside.

In the present embodiment, the heat medium flowing in the first fluid circuit 30 is water. However, the heat medium to be heated in the first fluid circuit 30 is not limited to water. The first fluid circuit 30 may be configured to heat another heat medium such as brine and air. In the present embodiment, the heat medium flowing in the second fluid circuit 40 is also water. The heat medium to be heated in the second fluid circuit 40 is not limited to water either. The second fluid circuit 40 may be configured to heat another liquid heat medium such as brine.

The boiler 10 includes a combustion chamber 12 and a combustor 14. An exhaust port is provided at the top of the combustion chamber 12. The combustor 14 is a heat source that produces flame and combustion gas, and is disposed inside the combustion chamber 12. The combustion gas as a thermal fluid generated in the combustor 14 moves upwardly in the internal space of the combustion chamber 12, and is discharged outside through the exhaust port. With the use of the combustor 14 that produces flame and combustion gas as the heat source in the CHP system 100, high-temperature thermal energy can easily be obtained. Consequently, the efficiency of electricity generation by the Rankine cycle apparatus 20 can be improved. Another device such as an air blower may be disposed inside the boiler 10.

The boiler 10 is, for example, a gas boiler. When the boiler 10 is a gas boiler, a fuel gas such as natural gas and biogas is supplied to the combustor 14. The combustor 14 produces flame and high-temperature combustion gas by combusting the fuel gas.

The Rankine cycle apparatus 20 includes an expander 21, a condenser 22, a pump 23, and an evaporator 24. These components are connected circularly by a plurality of pipes in the order in which they are mentioned, so that a closed circuit is formed. The Rankine cycle apparatus 20 may be provided with a commonly-known regenerator or the like.

The expander 21 expands the working fluid heated in the boiler 10. The expander 21 is, for example, a positive-displacement expander or a turbo-expander. Examples of the positive-displacement expander include scroll expanders, rotary expanders, screw expanders, and reciprocating expanders. The turbo-expander is a so-called expansion turbine. An electricity generator 26 is connected to the rotating shaft of the expander 21. The electricity generator 26 is driven by the expander 21. The Rankine cycle apparatus 20 is provided with a detector 27 that detects the amount of electricity (kWe) generated by the electricity generator 26. The detector 27 is typically a wattmeter. The information on the amount of electricity detected by the detector 27 is transmitted to the controller 50.

The condenser 22 allows heat exchange to take place between water in the first fluid circuit 30 and the working fluid discharged from the expander 21, thereby cooling the working fluid and heating the water. A commonly-known heat exchanger, such as a plate heat exchanger, a double tube heat exchanger, and a fin tube heat exchanger, can be used as the condenser 22. The type of the condenser 22 is selected as appropriate depending on the type of the heat medium in the first fluid circuit 30. When the heat medium in the first fluid circuit 30 is a liquid such as water, a plate heat exchanger or a double tube heat exchanger can be suitably used as the condenser 22. When the heat medium in the first fluid circuit 30 is a gas such as air, a fin tube heat exchanger can be suitably used as the condenser 22.

The pump 23 draws the working fluid flowing from the condenser 22, pressurizes the working fluid, and delivers the pressurized working fluid to the evaporator 24. A common positive-displacement pump or turbo-pump can be used as the pump 23. Examples of the positive-displacement pump include piston pumps, gear pumps, vane pumps, and rotary pumps. Examples of the turbo-pump include centrifugal pumps, mixed flow pumps, and axial-flow pumps.

Figure 2:
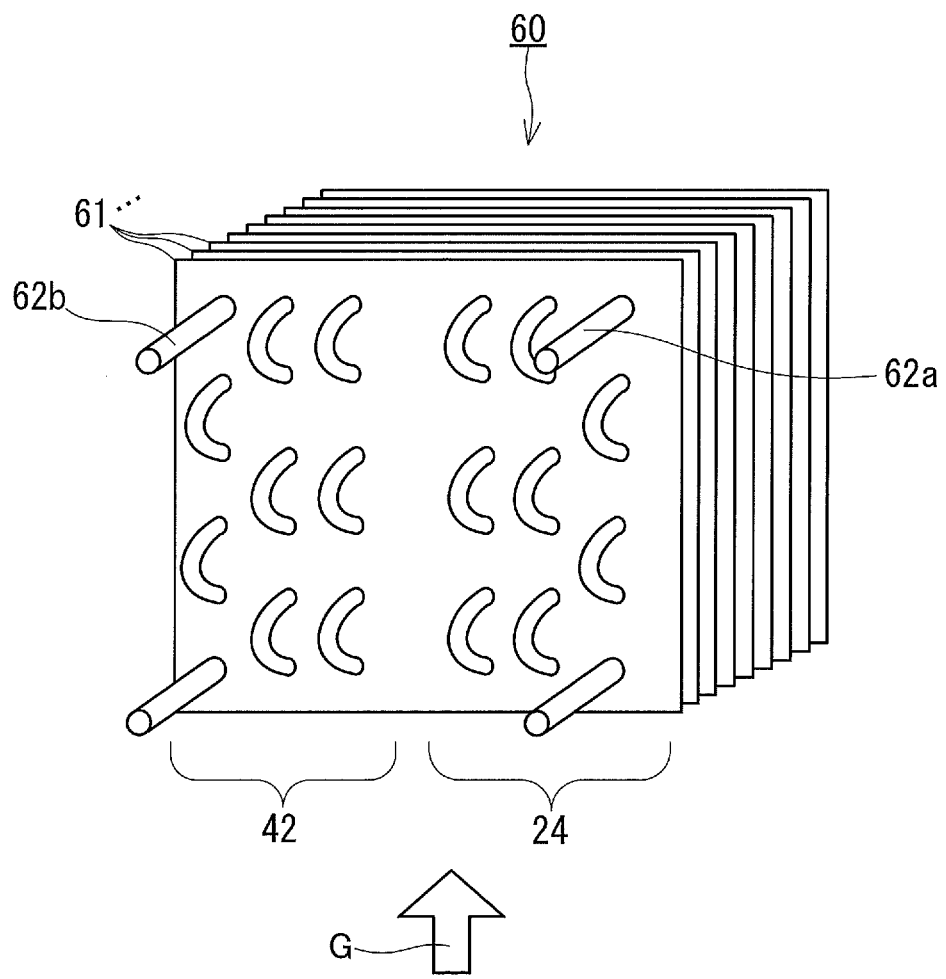
FIG. 2 is a perspective view of a heat exchange unit.

The evaporator 24 is a first heat exchanger that absorbs thermal energy from the combustion gas produced in the combustor 14. Specifically, the evaporator 24 is disposed inside the boiler 10. A fin tube heat exchanger, as shown in FIG. 2, can be used as the evaporator 24. The combustion gas produced in the combustor 14 and the working fluid of the Rankine cycle apparatus 20 exchange heat in the evaporator 24. Thus, the working fluid of the Rankine cycle apparatus 20 is heated and evaporated. Not only the heat of the combustion gas but also the radiant heat from the flame is applied to the evaporator 24. The evaporator 24 may be heated directly by the flame produced in the combustor 14 in some cases.

An organic working fluid can be suitably used as the working fluid of the Rankine cycle apparatus 20. Examples of the organic working fluid include halogenated hydrocarbons, hydrocarbons, and alcohols. Examples of the halogenated hydrocarbons include R-123 and R-245fa. Examples of the hydrocarbons include alkanes such as propane, butane, pentane, and isopentane. Examples of the alcohols include ethanol. These organic working fluids may be used alone, or a mixture of two or more thereof may be used. Also, there may be some cases where an inorganic working fluid such as water, carbon dioxide, and ammonia can be used as the working fluid.

The first fluid circuit 30 is connected to the condenser 22 of the Rankine cycle apparatus 20 so as to feed water to the condenser 22. The water in the first fluid circuit 30 is heated by the working fluid discharged from the expander 21.

When the heat medium to be heated through the first fluid circuit 30 is a liquid such as water, the first fluid circuit 30 can be formed by one or more pipes. When the heat medium to be heated through the first fluid circuit 30 is a gas such as air, the first fluid circuit 30 can be formed by an air path or a duct for the flow of the gas.

The second fluid circuit 40 has a second heat exchanger 42, a flow path 44a, a flow path 44b, and a flow rate regulator 46. Together with the evaporator 24 of the Rankine cycle apparatus 20, the second heat exchanger 42 is also disposed inside the boiler 10. The second heat exchanger 42 absorbs thermal energy from the combustion gas produced in the combustor 14 and transfers the thermal energy to water (heat medium). That is, the combustion gas produced in the combustor 14 and water in the second fluid circuit 40 exchange heat in the second heat exchanger 42. Thus, the water in the second fluid circuit 40 is heated. The radiant heat from the flame produced in the combustor 14 is also applied to the second heat exchanger 42. The second heat exchanger 42 may be heated directly by the flame produced in the combustor 14 in some cases.

The first fluid circuit 30 and the second fluid circuit 40 each are a circuit provided independently of the working fluid circuit of the Rankine cycle apparatus 20. This means that the fluid flowing in the first fluid circuit 30 and the working fluid of the Rankine cycle apparatus 20 are never mixed together and the fluid flowing in the second fluid circuit 40 and the working fluid of the Rankine cycle apparatus 20 are never mixed together. The second heat exchanger 42 is a heat exchanger for heating a heat medium (water in the present embodiment) different from the working fluid of the Rankine cycle apparatus 20.

A fin tube heat exchanger, as shown in FIG. 2, can be used as the second heat exchanger 42. The flow paths 44a and 44b are connected to the second heat exchanger 42 so as to feed water to the second heat exchanger 42. The flow paths 44a and 44b can each be formed by one or more pipes. The flow rate regulator 46 is disposed in the flow path 44a. The flow rate regulator 46 is typically a flow rate regulating valve. By controlling the flow rate regulator 46, the amount of water flowing through the second heat exchanger 42 can be regulated. That is, it is possible not only to regulate the amount of hot water to be produced on the demand for hot water (heat) but also to adjust the ratio (heat-to-power ratio) of the thermal output (kWt) to the electrical output (kWe) to an optimum range.

The controller 50 controls various targets such as the pump 23 of the Rankine cycle apparatus 20, the combustor 14 of the boiler 10, and the flow rate regulator 46 of the second fluid circuit 40. A DSP (Digital Signal Processor) including an A/D conversion circuit, an input/output circuit, a computing circuit, a memory device, etc. can be used as the controller 50. In the controller 50, there is stored a program for operating the CHP system 100 properly.

The hot water produced in the first fluid circuit 30 can be supplied to equipment such as faucets, hot water heater circuits, and hot water storage tanks. The first fluid circuit 30 may be used to heat lukewarm water or may be used to heat city water. The same applies to the second fluid circuit 40.

In the present embodiment, the evaporator 24, the second heat exchanger 42, and the combustor 14 are disposed inside the boiler 10 so that the combustion gas G can be supplied from the combustor 14 to the evaporator 24 and the second heat exchanger 42 respectively. Specifically, the evaporator 24 and the second heat exchanger 42, together with the combustor 14, are disposed inside the combustion chamber 12. That is, a combustion gas flow path 16 (thermal fluid flow path) as the flow path of the combustion gas is formed by the internal space of the combustion chamber 12. With such a configuration, the high-temperature combustion gas is smoothly introduced into the evaporator 24 and the second heat exchanger 42.

The combustion gas flow path 16 includes a first flow path 16a and a second flow path 16b. The first flow path 16a is a flow path that allows the combustion gas to reach the evaporator 24 directly from the combustor 14. The second flow path 16b is a flow path that allows the combustion gas to reach the second heat exchanger 42 directly from the combustor 14. The second flow path 16b is also a flow path that is defined so that the combustion gas is supplied from the combustor 14 to the second heat exchanger 42 through a path independent of the first flow path 16a. The evaporator 24 and the second heat exchanger 42 are disposed above the combustor 14 and are arranged side by side in the horizontal direction. Therefore, the first flow path 16a is formed by the space between the combustor 14 and the evaporator 24. The second flow path 16b is formed by the space between the combustor 14 and the second heat exchanger 42. The phrase "the combustion gas reaches the evaporator 24 directly from the combustor 14" means that the combustion gas reaches the evaporator 24 from the combustor 14 without passing through the second heat exchanger 42. Likewise, the phrase "the combustion gas reaches the second heat exchanger 42 directly from the combustor 14" means that the combustion gas reaches the second heat exchanger 42 from the combustor 14 without passing through the evaporator 24.

With the configuration described above, the second heat exchanger 42 can receive a certain amount of energy from the combustion gas. The second heat exchanger 42 is less affected by the evaporator 24. Therefore, the second fluid circuit 40 can supply hot water regardless of the operation state of the Rankine cycle apparatus 20. Both of the evaporator 24 and the second heat exchanger 42 can receive thermal energy from the high-temperature combustion gas produced in the combustor 14. Thereby, the efficiency of energy conversion by the evaporator 24 and the second heat exchanger 42 is improved. As a result, the efficiency of electricity generation by the Rankine cycle apparatus 20 and the efficiency of hot water production by the second fluid circuit 40 are improved, and consequently, the amount of generated electricity and the amount of supplied hot water are increased. These effects can be ensured because the combustion gas can reach the second heat exchanger 42 from the combustor 14 without passing through the evaporator 24 and the combustion gas can reach the evaporator 24 from the combustor 14 without passing through the second heat exchanger 42.

In the present embodiment, the evaporator 24 directly faces the combustor 14 across the first flow path 16a. Likewise, the second heat exchanger 42 directly faces the combustor 14 across the second flow path 16b. That is, neither the first flow path 16a nor the second flow path 16b has an object provided therein to block the flow of the combustion gas. With such a configuration, the combustion gas can reach the evaporator 24 and the second heat exchanger 42 respectively while maintaining its high flow speed. Therefore, the heat transfer coefficients on the surface of the evaporator 24 and the second heat exchanger 42 are improved and high efficiency of heat exchange can be achieved. The evaporator 24 and the second heat exchanger 42 each can directly receive the radiant heat from the flame in addition to the heat of the combustion gas. Therefore, the evaporator 24 and the second heat exchanger 42 can receive a considerable amount of thermal energy efficiently. In addition, the second heat exchanger 42 is never present between the combustor 14 and the evaporator 24, and the evaporator 24 is never present between the combustor 14 and the second heat exchanger 42. Therefore, as long as a certain amount of thermal energy is produced in the combustor 14, the evaporator 24 and the second heat exchanger 42 can each receive the thermal energy stably.

The evaporator 24 and the second heat exchanger 42 are arranged side by side in the horizontal direction in the internal space of the boiler 10. When the evaporator 24 and the second heat exchanger 42 are orthogonally projected onto a plane of projection perpendicular to the flow direction of the combustion gas (for example, the vertical direction) in the combustion gas flow path 16, the projected image of the evaporator 24 and the projected image of the second heat exchanger 42 do not overlap each other on the plane of projection. In other words, the projected image of the evaporator 24 is entirely separated from the projected image of the second heat exchanger 42. When the evaporator 24 and the second heat exchanger 42 are in this positional relationship, the effects mentioned above can be ensured.

In the present embodiment, the evaporator 24 of the Rankine cycle apparatus 20 and the second heat exchanger 42 of the second fluid circuit 40 are in contact with each other in the boiler 10. Therefore, thermal energy produced in the combustor 14 can be given to the water in the second heat exchanger 42 via the evaporator 24. Accordingly, even if the evaporator 24 absorbs the thermal energy when the Rankine cycle apparatus 20 is not in operation (when the pump 23 is not in operation), heat can be transferred from the evaporator 24 to the water in the second heat exchanger 42. Consequently, thermal damage to the evaporator 24 can be prevented, in addition to which thermal decomposition of the working fluid and the lubricating oil can also be prevented. Moreover, hot water can be produced by use of the second fluid circuit 40 even when the Rankine cycle apparatus 20 is not in operation.

As shown in FIG. 2, the evaporator 24 and the second heat exchanger 42 are in direct contact with each other so that heat of the evaporator 24 can be directly transferred to the second heat exchanger 42 via a medium other than air. Specifically, each of the evaporator 24 and the second heat exchanger 42 is a fin tube heat exchanger, and the evaporator 24 and the second heat exchanger 42 share a plurality of fins 61. The evaporator 24 is formed of the right halves of the plurality of fins 61 and a heat transfer tube 62a. The second heat exchanger 42 is formed of the left halves of the plurality of fins 61 and a heat transfer tube 62b. The heat transfer tube 62a of the evaporator 24 does not communicate with the heat transfer tube 62b of the second heat exchanger 42. The working fluid flows through the heat transfer tube 62a, and water flows through the heat transfer tube 62b. The heat of the evaporator 24 can be efficiently transferred via the fins 61 to the water flowing in the second heat exchanger 42. Thus, defects such as thermal damage to the evaporator 24, thermal decomposition of the working fluid, and thermal decomposition of the lubricating oil, can be prevented. It should be noted that the right and left positional relationship between the evaporator 24 and the second heat exchanger 42 in the heat exchange unit 60 is not limited to the example shown in FIG. 2.

In the present embodiment, the evaporator 24 and the second heat exchanger 42 form a single heat exchange unit 60. The heat exchange unit 60 is disposed inside the boiler 10 so as to be located directly above the combustor 14. The fins 61 are aligned in the horizontal direction. The heat transfer tubes 62a and 62b each pierce through the fins 61 in the horizontal direction. The spaces formed between the adjacent fins 61 form an exhaust path of the combustion gas G, that is, a portion of the combustion gas flow path 16. With such a configuration, the second heat exchanger 42 can absorb thermal energy directly from the combustion gas G even when the Rankine cycle apparatus 20 is not in operation. Therefore, the amount of thermal energy wasted when the Rankine cycle apparatus 20 is not in operation can be reduced, and high energy use efficiency can be achieved.

In the present embodiment, the flow direction of the combustion gas in the combustion gas flow path 16 is parallel to the vertical direction. Since the flow direction of the combustion gas in the first flow path 16a and the second flow path 16b is also parallel to the vertical direction, the flow direction of the combustion gas in the first flow path 16a is parallel to the flow direction of the combustion gas in the second flow path 16b. Furthermore, the distance (shortest distance) from the combustor 14 to the evaporator 24 is equal to the distance (shortest distance) from the combustor 14 to the second heat exchanger 42. For example, when each of the evaporator 24 and the second heat exchanger 42 is a fin tube heat exchanger, the lower end of the fin of the evaporator 24 and the lower end of the fin of the second heat exchanger 42 are located equidistant from the combustor 14. As described with reference to FIG. 2, in the present embodiment, the evaporator 24 and the second heat exchanger 42 share the plurality of fins 61. The distances from the combustor 14 to the lower ends of the fins 61 are all equal. With such a configuration, it is easy to stabilize the supply of the thermal energy from the combustor 14 to each of the evaporator 24 and the second heat exchanger 42. This configuration is also advantageous in increasing the efficiency of energy conversion. Furthermore, sufficient reduction of the distance from the combustor 14 to the evaporator 24 and the distance from the combustor 14 to the second heat exchanger 42 makes it possible to reduce the radiation loss and makes it easier to supply the high-temperature combustion gas to the evaporator 24 and the second heat exchanger 42 respectively.

The structures of the evaporator 24 and the second heat exchanger 42 are not particularly limited, as long as good heat transfer from the evaporator 24 to the second heat exchanger 42 can be achieved. For example, the evaporator 24 and the second heat exchanger 42 may each be formed by a serpentine heat transfer tube. In this case, the heat transfer tubes are in direct contact with each other. That is, it is desirable that a component of the evaporator 24 be in direct contact with a component of the second heat exchanger 42.

Next, two typical operation modes of the CHP system 100 will be described. The first operation mode is an operation mode used when the Rankine cycle apparatus 20 is in operation. The second operation mode is an operation mode used when the Rankine cycle apparatus 20 is not in operation.

<First Operation Mode>

In the first operation mode, the CHP system 100 can supply both hot water and electricity to the outside. First, the pump 23 is driven to start the operation of the Rankine cycle apparatus 20, and feed of water to the first fluid circuit 30 is started at an appropriate time. Thereafter, supply of a fuel to the combustor 14 is started at an appropriate time, and the fuel is ignited. The working fluid of the Rankine cycle apparatus 20 receives heat from flame and combustion gas in the evaporator 24, and changes to a superheated gaseous form. The high-temperature gaseous working fluid is delivered to the expander 21. In the expander 21, the pressure energy of the working fluid is converted to mechanical energy, so that the electricity generator 26 is driven. Thus, electricity is generated in the electricity generator 26. The working fluid discharged from the expander 21 flows into the condenser 22. The working fluid may maintain the superheated state at the outlet of the expander 21. In the condenser 22, the working fluid is cooled and condensed by water flowing in the first fluid circuit 30. The water in the first fluid circuit 30 is heated by the working fluid. Hot water is produced in the first fluid circuit 30, and the produced hot water is supplied to the outside. The condensed working fluid is pressurized by the pump 23, and is delivered to the evaporator 24 again.

Independently of the operation of the Rankine cycle apparatus 20, feed of water to the second fluid circuit 40 is started at an appropriate time. The water flowing in the second fluid circuit 40 is heated by the combustion gas. Hot water is produced also in the second fluid circuit 40, and the produced hot water is supplied to the outside.

In the first operation mode, the controller 50 controls the pump 23 and/or the flow rate regulator 46 based on the amount of generated electricity detected by the detector 27. Such control makes it possible to freely and finely adjust the electrical output and the thermal output on demand. For example, if a command to increase the electrical output is input to the controller 50 (that is, when the electrical output should be increased), the controller 50 controls the pump 23 so as to increase the circulation rate of the working fluid, and controls the flow rate regulator 46 so as to reduce the flow rate of water in the second fluid circuit 40. Specifically, the controller 50 increases the rotation speed of the pump 23, and reduces the degree of opening of the flow rate regulator 46. Conversely, if a command to reduce the electrical output is input to the controller 50 (that is, when the electrical output should be reduced), the controller 50 controls the pump 23 so as to reduce the circulation rate of the working fluid, and controls the flow rate regulator 46 so as to increase the flow rate of water in the second fluid circuit 40. Specifically, the controller 50 reduces the rotation speed of the pump 23, and increases the degree of opening of the flow rate regulator 46. Both the control of the pump 23 and the control of the flow rate regulator 46 may be carried out, or one of the controls may be carried out alone, depending on the amount of generated electricity detected by the detector 27.

Furthermore, when the controller 50 detects malfunction of the Rankine cycle apparatus 20, the controller 50 controls the flow rate regulator 46 so as to increase the flow rate of water in the second fluid circuit 40. For example, when the controller 50 detects that the amount of generated electricity detected by the detector 27 has become zero, the controller 50 determines that malfunction of the Rankine cycle apparatus 20 has occurred, and controls the flow rate regulator 46. Thus, defects such as thermal damage to the evaporator 24 and an excessive increase in the internal pressure of the Rankine cycle apparatus 20 can be prevented even when unexpected failure or the like has occurred in the Rankine cycle apparatus 20. When the boiler 10 is a gas boiler, defects such as thermal damage to the evaporator 24 can be prevented more reliably by stopping the supply of the fuel to the combustor 14. As described later, however, when the boiler 10 is a pellet boiler, there is a possibility that the production of the combustion gas cannot be stopped immediately. In such a situation, defects such as thermal damage to the evaporator 24 can be prevented by controlling the flow rate regulator 46 to feed a larger amount of water to the second fluid circuit 40.

Furthermore, in the first operation mode, hot water having a sufficiently high temperature can be produced through the first fluid circuit 30. Therefore, when the Rankine cycle apparatus 20 is performing steady operation in the first operation mode, there is no need to feed water to the second fluid circuit 40. However, when the operation of the Rankine cycle apparatus 20 is in a transition period, it is desirable to feed an appropriate amount of water to the second fluid circuit 40 in terms of prevention of defects such as thermal damage to the evaporator 24. Examples of the transition period include a period during which the operation transits to the steady operation immediately after the start of the operation and a period during which processes for stopping the operation are carried out.

<Second Operation Mode>

In the second operation mode, the Rankine cycle apparatus 20 is not in operation, and the CHP system 100 can supply hot water alone to the outside. The CHP system 100 is capable of heating water by feeding water to the second heat exchanger 42 when the Rankine cycle apparatus 20 is not generating electricity. Specifically, water is fed to the second fluid circuit 40 so that hot water is produced by use of the second fluid circuit 40. The second heat exchanger 42 directly absorbs heat of the combustion gas and, at the same time, indirectly absorbs heat of the combustion gas via the evaporator 24. Thus, it is possible to produce hot water in the second heat exchanger 42 while preventing defects such as thermal damage to the evaporator 24 and thermal decomposition of the working fluid, thereby improving the convenience for users. In the second operation mode, the flow rate regulator 46 is controlled to be fully open, for example.

Hereinafter, several modifications of the CHP system will be described. The elements common between the CHP system 100 shown in FIG. 1 and each modification are denoted by the same reference numerals, and the description thereof is omitted. That is, the matters described for the CHP system 100 can apply to the modifications below as long as there is no technical inconsistency between them.

First Modification

Figure 3:
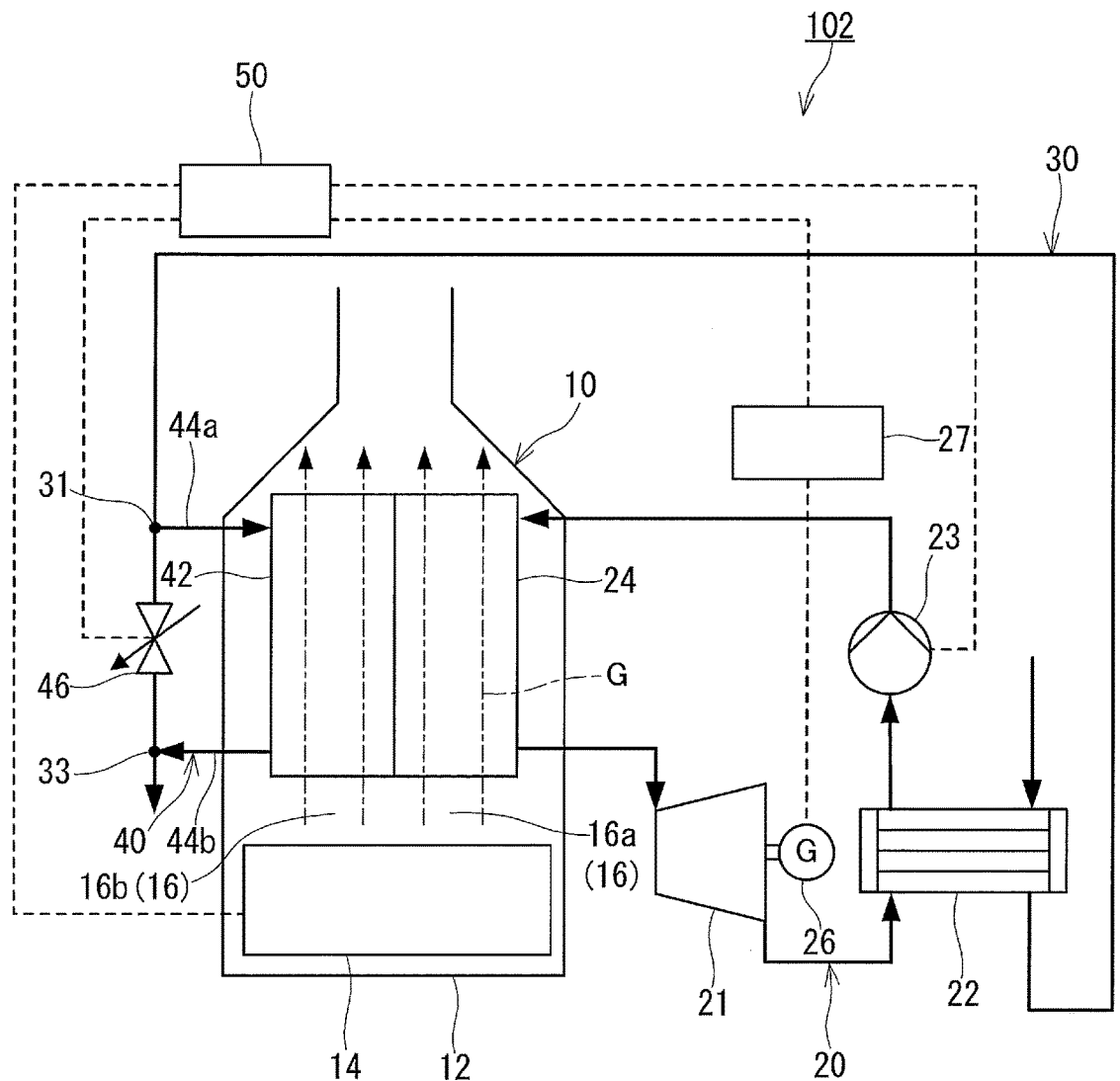
FIG. 3 is a configuration diagram of a combined heat and power system according to a first modification.

As shown in FIG. 3, a CHP system 102 according to the first modification includes the first fluid circuit 30 and the second fluid circuit 40 connected together in series. That is, the first fluid circuit 30 and the second fluid circuit 40 may be connected together in series so that the water heated through the first fluid circuit 30 is further heated through the second fluid circuit 40. In this case, higher-temperature hot water can be produced.

Also in the present modification, the second fluid circuit 40 is composed of the flow path 44a, the second heat exchanger 42, and the flow path 44b. The flow path 44a branches from the first fluid circuit 30 at a branch point 31, and is connected to the inlet of the second heat exchanger 42. The flow path 44b is connected to the outlet of the second heat exchanger 42, and joins to the first fluid circuit 30 at a junction point 33. In the first fluid circuit 30, the flow rate regulator 46 is disposed between the branch point 31 and the junction point 33. With such a configuration, not only can all of the water heated in the first fluid circuit 30 be further heated in the second heat exchanger 42, but also only a portion of the water heated in the first fluid circuit 30 can be further heated in the second heat exchanger 42. The pressure loss of water in the second heat exchanger 42 is relatively large; therefore, when the flow rate regulator 46 is fully opened, a large portion of water bypasses the second heat exchanger 42, and only a small amount of water flows through the second heat exchanger 42. In this manner, the ratio of the amount of water bypassing the second heat exchanger 42 to the amount of water flowing through the second heat exchanger 42 can be adjusted by the flow rate regulator 46. Therefore, the electrical output and the thermal output can be freely and finely adjusted on demand. In addition, by feeding an appropriate amount of the water (for example, all of the water) to the second heat exchanger 42 when the Rankine cycle apparatus 20 is not in operation, prevention of defects such as thermal damage to the evaporator 24 and an excessive increase in the internal pressure of the Rankine cycle apparatus 20 can be ensured. An on-off valve may be used instead of the flow rate regulator 46. This applies also to the other modifications.

Second Modification

Figure 4:
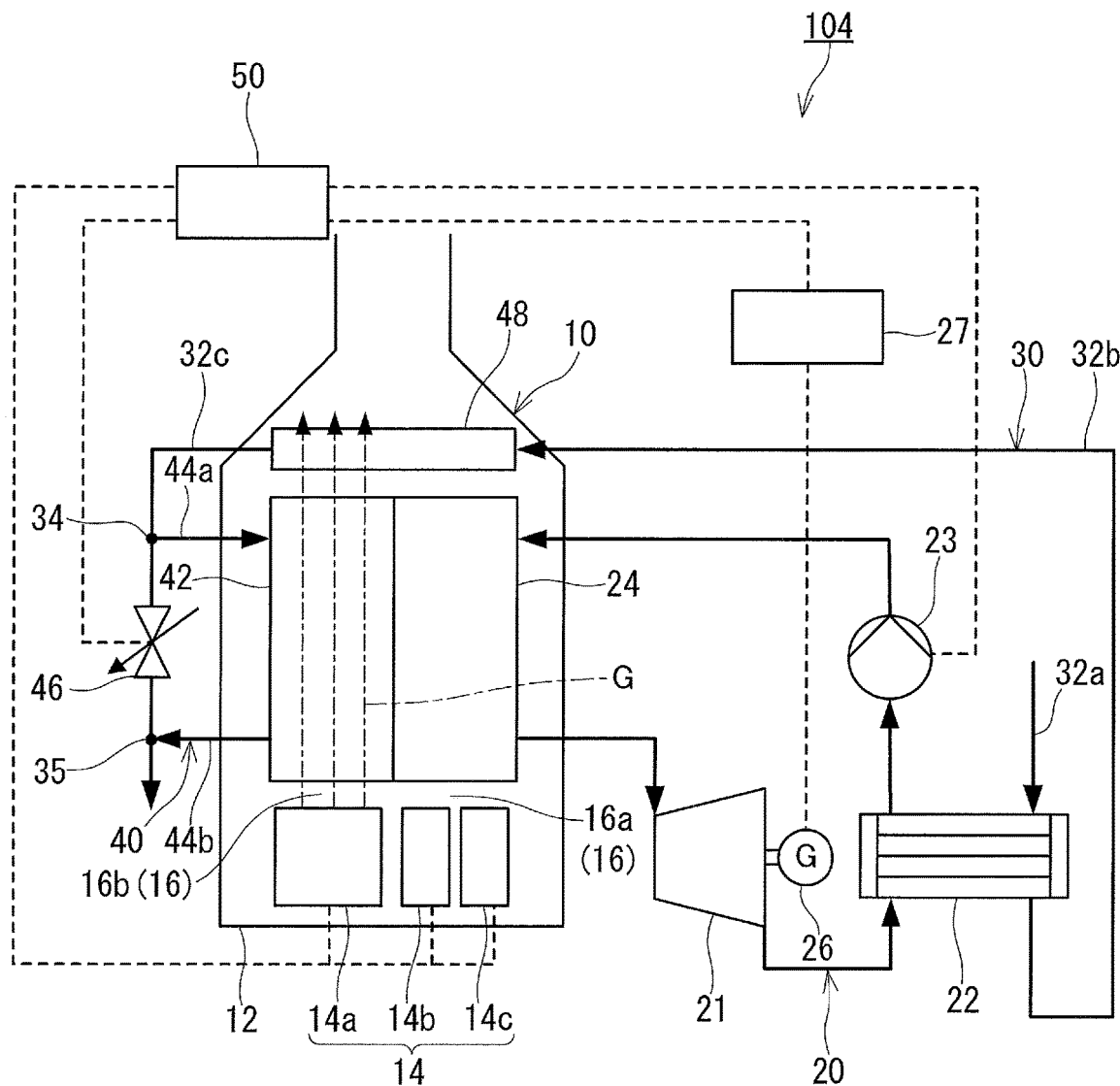
FIG. 4 is a configuration diagram of a combined heat and power system according to a second modification.

As shown in FIG. 4, a CHP system 104 according to the second modification has, as the combustor 14, a plurality of discrete combustors 14a, 14b, and 14c capable of producing flame and combustion gas independently of each other. The positional relationship between the second heat exchanger 42 and the discrete combustors 14a, 14b, and 14c is determined so that the combustion gas produced in at least one of the discrete combustors, i.e., the discrete combustor 14a, is supplied substantially only to the second heat exchanger 42. Specifically, the second heat exchanger 42 is located directly above the discrete combustor 14a of the discrete combustors 14a, 14b, and 14c, and the evaporator 24 is not present directly above the discrete combustor 14a. The evaporator 24 is located directly above the other discrete combustors 14b and 14c, and the second heat exchanger 42 is not present directly above these discrete combustors 14b and 14c. In other words, when the evaporator 24 is orthogonally projected onto the combustor 14, the projected image of the evaporator 24 overlaps only the discrete combustors 14b and 14c. When the second heat exchanger 42 is orthogonally projected onto the combustor 14, the projected image of the second heat exchanger 42 overlaps only the discrete combustor 14a. The combustion gas G produced in the discrete combustor 14a travels toward the second heat exchanger 42. With the CHP system 104 according to the present modification, it is possible, when the Rankine cycle apparatus 20 is not in operation, to produce hot water in the second heat exchanger 42 while further ensuring the prevention of defects such as thermal damage to the evaporator 24.

The phrase "the combustion gas produced in the discrete combustor 14a is supplied substantially only to the second heat exchanger 42" means, for example, that only the second heat exchanger 42 is present above the discrete combustor 14a. Therefore, even if the flow of the combustion gas having flowed into the second heat exchanger 42 changes its direction and flows into the evaporator 24, the combustion gas is supplied substantially only to the second heat exchanger 42.

The scales (the heating powers) of the discrete combustors 14a, 14b, and 14c are not particularly limited. For example, the heating power of the discrete combustor 14a may be relatively low, while the total heating power of the discrete combustors 14b and 14c may be relatively high. With such a configuration, the Rankine cycle apparatus 20 can be endowed with sufficient capacity to generate electricity. Conversely, the heating power of the discrete combustor 14a may be relatively high, while the total heating power of the discrete combustors 14b and 14c may be relatively low. In this case, even when the operation of the Rankine cycle apparatus 20 is stopped, a sufficient amount of hot water can be supplied. That is, sufficient space heating performance is exhibited.

The CHP system 104 further includes a third heat exchanger 48. The third heat exchanger 48 is disposed inside the boiler 10 so as to be located farther from the combustor 14 than are the evaporator 24 and the second heat exchanger 42. The third heat exchanger 48 is, for example, a fin tube heat exchanger. The third heat exchanger 48 is not in direct contact with the evaporator 24, and a gap of appropriate width is provided between the third heat exchanger 48 and the evaporator 24. Likewise, the third heat exchanger 48 is not in direct contact with the second heat exchanger 42, and a gap of appropriate width is provided between the third heat exchanger 48 and the second heat exchanger 42. In the present embodiment, the same heat medium as that flowing through the second heat exchanger 42, i.e., water, flows through the third heat exchanger 48. In the third heat exchanger 48, the thermal energy of the combustion gas produced in the combustor 14 is transferred to water. With the use of the third heat exchanger 48, that remaining portion of the thermal energy of the combustion gas which has not been absorbed in the evaporator 24 and the second heat exchanger 42 can be recovered. Consequently, the efficiency of use of the thermal energy produced in the combustor 14 is improved.

In the present modification, the third heat exchanger 48 is provided in the first fluid circuit 30 so as to further heat the water heated in the condenser 22 of the Rankine cycle apparatus 20. To be specific, the first fluid circuit 30 is composed of flow paths 32a to 32c and the third heat exchanger 48. The water outlet of the condenser 22 and the inlet of the third heat exchanger 48 are connected by the flow path 32b. Therefore, the water flowing in the first fluid circuit 30 is heated in the condenser 22 by the working fluid of the Rankine cycle apparatus 20, and then further heated by the residual heat of the combustion gas G in the third heat exchanger 48. The flow path 32c is connected to the outlet of the third heat exchanger 48. Hot water can be supplied to the outside through the flow path 32c.

Additionally, in the present modification, the third heat exchanger 48 is connected to the second heat exchanger 42 so that the water having passed through the third heat exchanger 48 flows into the second heat exchanger 42. With such a configuration, water with a relatively low temperature flows through the third heat exchanger 48, while water with a relatively high temperature flows through the second heat exchanger 42. Therefore, a larger amount of thermal energy can be absorbed in the second heat exchanger 42 and the third heat exchanger 48. Consequently, the efficiency of use of the thermal energy produced in the combustor 14 is improved.

More specifically, the flow path 44a of the second fluid circuit 40 branches from the flow path 32c of the first fluid circuit 30. That is, the first fluid circuit 30 and the second fluid circuit 40 are connected in series. In addition, the outlet of the second heat exchanger 42 and the flow path 32c are connected by the flow path 44b at a junction point 35 located downstream of a branch point 34 between the flow path 32c and the flow path 44a. The hot water flowing from the second heat exchanger 42 is returned to the flow path 32c of the first fluid circuit 30 through the flow path 44b. The water heated in the condenser 22 is further heated in the third heat exchanger 48 and the second heat exchanger 42. Consequently, the efficiency of use of the thermal energy produced in the combustor 14 is further improved. In the first fluid circuit 30 (flow path 32c), the flow rate regulator 46 is disposed between the branch point 34 and the junction point 35. By control of the flow rate regulator 46, not only can all of the water heated in the first fluid circuit 30 be further heated in the second heat exchanger 42, but also only a portion of the water heated in the first fluid circuit 30 can be further heated in the second heat exchanger 42. The pressure loss of water in the second heat exchanger 42 is relatively large; therefore, when the flow rate regulator 46 is fully opened, a large portion of water bypasses the second heat exchanger 42, and only a small amount of water flows through the second heat exchanger 42. In this manner, the ratio of the amount of water bypassing the second heat exchanger 42 to the amount of water flowing through the second heat exchanger 42 can be adjusted by the flow rate regulator 46. Therefore, the electrical output and the thermal output can be freely and finely adjusted on demand. By feeding an appropriate amount of the water to the second heat exchanger 42 when the Rankine cycle apparatus 20 is not in operation, defects such as thermal damage to the evaporator 24 and an excessive increase in the internal pressure of the Rankine cycle apparatus 20 can be prevented.

The third heat exchanger 48 may be provided independently of the first fluid circuit 30 and the second fluid circuit 40. In other words, the third heat exchanger 48 may be a heat exchanger capable of heating a heat medium different from the heat medium to be heated in the first fluid circuit 30 and the second fluid circuit 40. The third heat exchanger 48 may be provided in the previously described CHP system 100 or 102.

The discrete combustors 14a, 14b, and 14c may each be operated alone, or two or more combustors selected from the discrete combustors 14a, 14b, and 14c may be operated simultaneously. For example, when the operation of the discrete combustors 14b and 14c is stopped and only the discrete combustor 14a is in operation, substantially only the second heat exchanger 42 receives thermal energy and only hot water is produced. When only the discrete combustors 14b or 14c is in operation, substantially only the evaporator 24 receives thermal energy and electricity and hot water are produced by the Rankine cycle apparatus 20. That is, by controlling the combustor 14 on the demand for hot water and the demand for electricity, it is possible to adjust the electrical output and thermal output freely, thereby improving the convenience for users.

Third Modification

Figure 5:
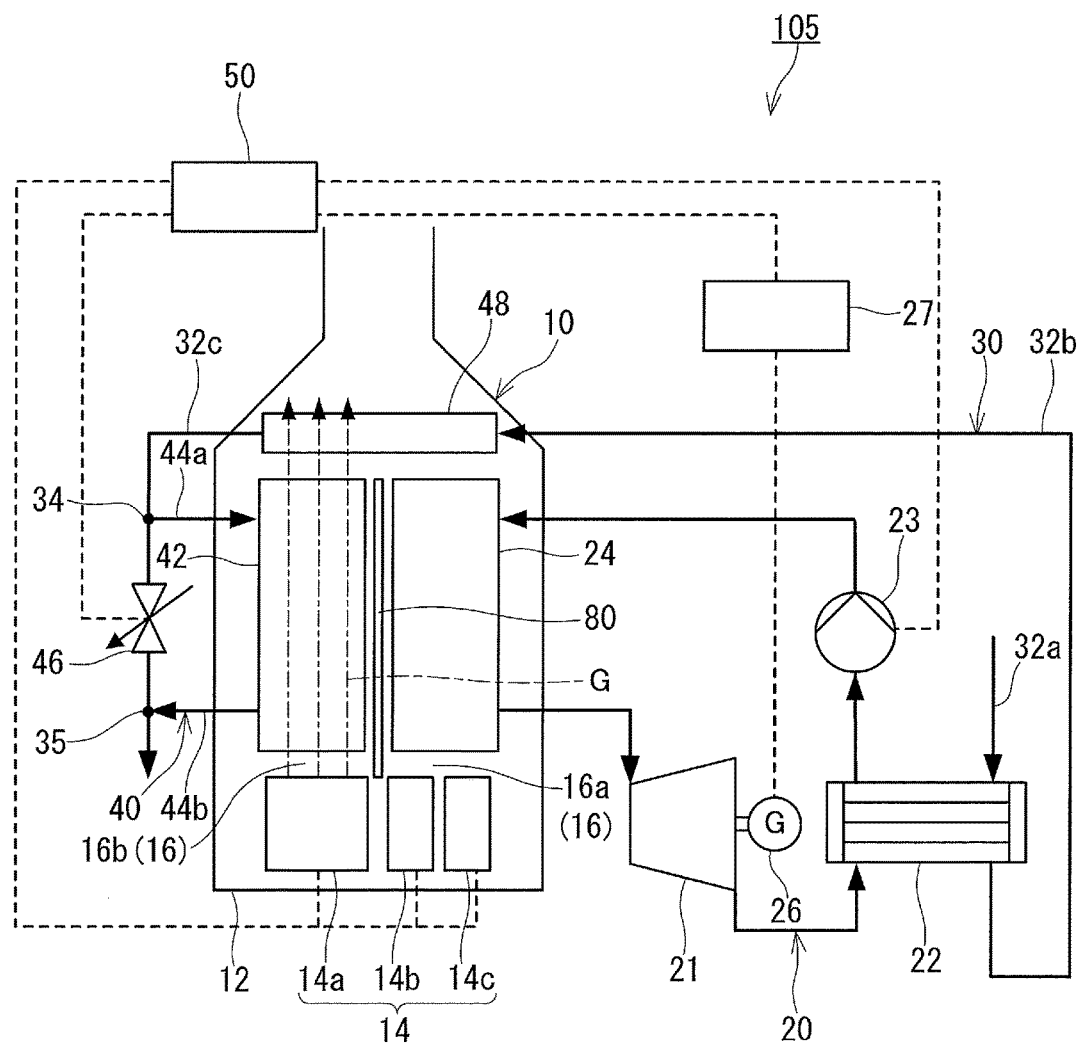
FIG. 5 is a configuration diagram of a combined heat and power system according to a third modification.

As shown in FIG. 5, a CHP system 105 according to the third modification includes a partition 80 disposed between the evaporator 24 and the second heat exchanger 42, in addition to the CHP system 104 of the second modification. With this partition 80, the combustion gas flow path 16 can be partitioned into a portion where the evaporator 24 is disposed and a portion where the second heat exchanger 42 is disposed. As a result, the combustion gas can be supplied from the discrete combustors 14a, 14b, and 14c to the evaporator 24 and the second heat exchanger 42 respectively. The partition 80 can prevent the supply of the combustion gas G to the evaporator 24 during the supply of the combustion gas G to the second heat exchanger 42. Accordingly, it is possible, when the Rankine cycle apparatus 20 is not in operation, to produce hot water in the second heat exchanger 42 while further ensuring the prevention of defects such as thermal damage to the evaporator 24.

Specifically, a gap is formed between the evaporator 24 and the second heat exchanger 42. That is, the evaporator 24 is not in direct contact with the second heat exchanger 42. The plate-like partition 80 is disposed in the gap between the evaporator 24 and the second heat exchanger 42. In other words, the partition 80 also is disposed in the combustion gas flow path 16. The partition 80 extends from a region facing the evaporator 24 and the second heat exchanger 42 toward the combustor 14 and projects downwardly from the lower end of the gap between the evaporator 24 and the second heat exchanger 42, thereby partitioning the first flow path 16a from the second flow path 16b. With such a configuration, it is ensured that the combustion gas produced in the discrete combustor 14a flows into the second heat exchanger 42 through the second flow path 16b. The partition 80 prevents the combustion gas produced in the discrete combustor 14a from flowing into the evaporator 24. Likewise, it is ensured that the combustion gas produced in the discrete combustors 14b and 14c flows into the evaporator 24 through the first flow path 16a. The partition 80 prevents the combustion gas produced in the discrete combustors 14b and 14c from flowing into the second heat exchanger 42. Furthermore, the partition 80 prevents the combustion gas flowing in the second heat exchanger 42 from changing its direction and flowing into the evaporator 24. The partition 80 prevents the combustion gas flowing in the evaporator 24 from changing its direction and flowing into the second heat exchanger 42. In this manner, the partition 80 helps supply the combustion gas to the evaporator 24 and the second heat exchanger 42 respectively and independently. Therefore, with the CHP system 105 according to the present modification, it is possible, when the Rankine cycle apparatus 20 is not in operation, to produce hot water in the second heat exchanger 42 while further ensuring the prevention of defects such as thermal damage to the evaporator 24.

Fourth Modification

Figure 6:
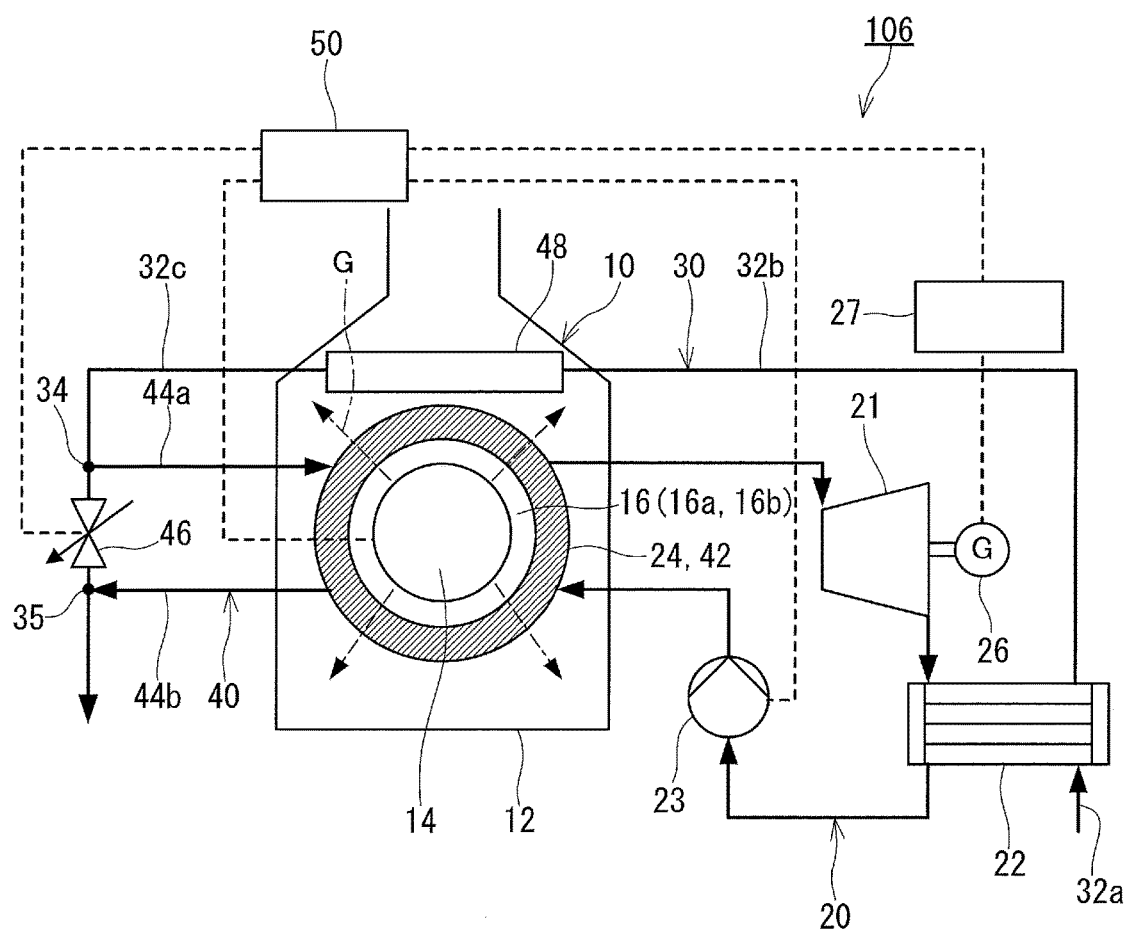
FIG. 6 is a configuration diagram of a combined heat and power system according to a fourth modification.
Figure 7:
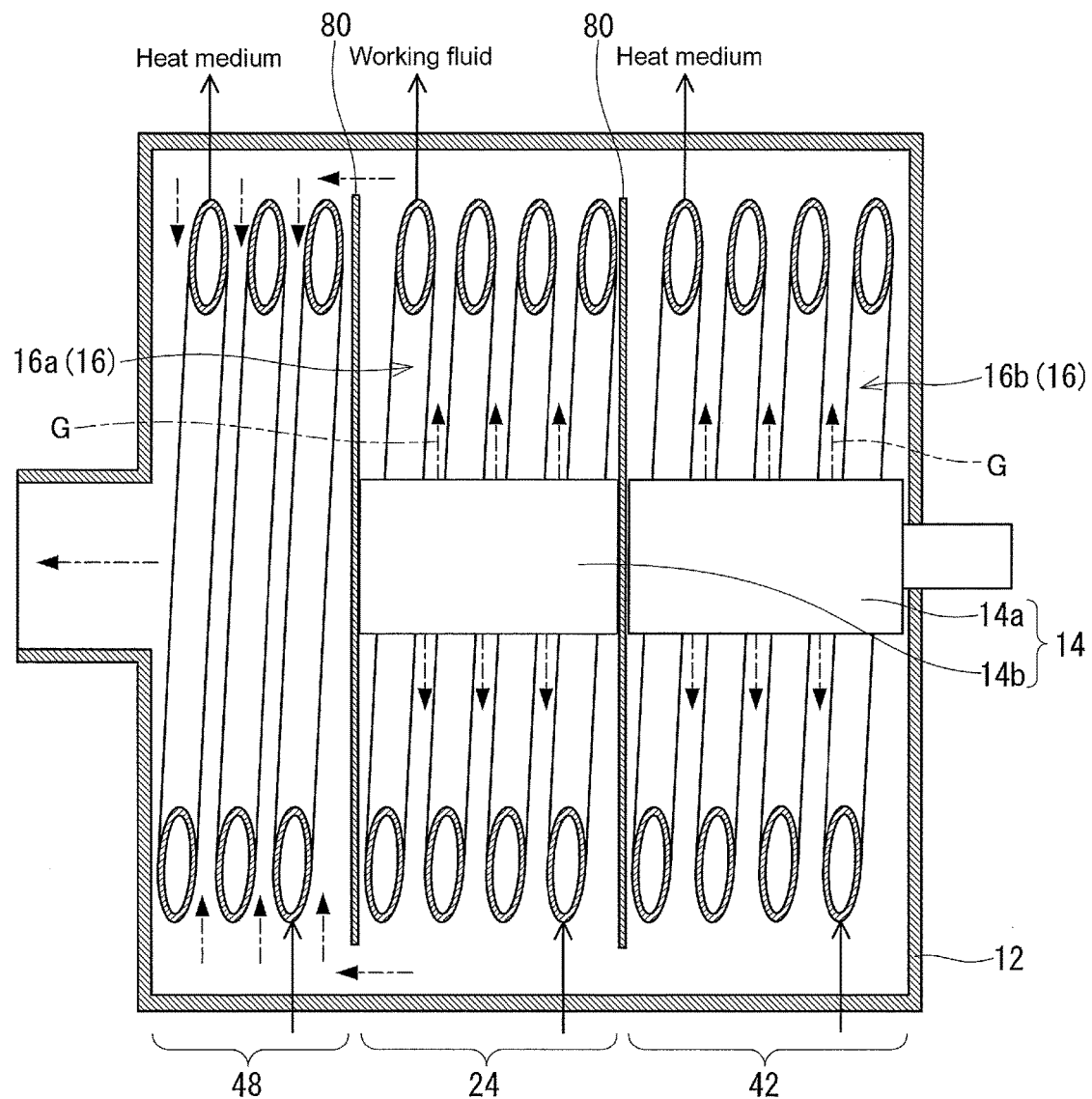
FIG. 7 is a schematic cross-sectional view showing the positional relationship among a combustor, a first heat exchanger (evaporator), and a second heat exchanger in the combined heat and power system shown in FIG. 6.

As shown in FIG. 6 and FIG. 7, a CHP system 106 according to the fourth modification includes a cylindrical combustor as the combustor 14. The combustor 14 is configured to allow the combustion gas G to flow radially outward. Boilers having such a structure are in widespread use mainly in Europe, and are provided, for example, by VIESSMANN in Germany.

As shown in FIG. 7, a heat transfer tube as the evaporator 24 is disposed around the cylindrical combustor 14. The heat transfer tube as the evaporator 24 is formed in a helical shape, and surrounds the combustor 14 at a slight distance from the combustor 14. In addition, a heat transfer tube as the second heat exchanger 42 is disposed around the combustor 14. The heat transfer tube as the second heat exchanger 42 is also formed in a helical shape, and surrounds the combustor 14 at a slight distance from the combustor 14. The evaporator 24 and the second heat exchanger 42 are arranged in the axial direction of the combustor 14. The first flow path 16a is formed by the space between the combustor 14 and the evaporator 24. The second flow path 16b is formed by the space between the combustor 14 and the second heat exchanger 42. The "axial direction of the combustor 14" means the height direction of the cylindrical combustor 14.

In the present modification, the cylindrical combustor 14 is composed of discrete combustors 14a and 14b capable of producing flame and combustion gas independently of each other. The discrete combustors 14a and 14b are adjacent to each other in the axial direction of the combustor 14. The evaporator 24 is located around the discrete combustor 14b, i.e., one of the discrete combustors 14a and 14b, and the second heat exchanger 42 is not present around the discrete combustor 14b. The second heat exchanger 42 is located around the other discrete combustor 14a, and the evaporator 24 is not present around the discrete combustor 14a. In the present modification, the evaporator 24 is located closer to the exhaust port of the combustion chamber 12, and the second heat exchanger 42 is located farther from the exhaust port. However, the positional relationship between the evaporator 24 and the second heat exchanger 42 with respect to the exhaust port of the combustion chamber 12 is not particularly limited. The second heat exchanger 42 may be located closer to the exhaust port of the combustion chamber 12, and the evaporator 24 may be located farther from the exhaust port.

The partition 80 extending toward the inner wall surface of the combustion chamber 12 is provided between the evaporator 24 and the second heat exchanger 42. The partition 80 has, for example, a disk shape and partitions the first flow path 16a from the second flow path 16b. A gap is formed between the outer circumference of the partition 80 and the inner wall surface of the combustion chamber 12 so as to allow the combustion gas to pass through. The role of the partition 80 is as described in the third modification.

The combustion gas G produced in the discrete combustor 14a is supplied to the second heat exchanger 42 through the second flow path 16b. The combustion gas G produced in the discrete combustor 14b is supplied to the evaporator 24 through the first flow path 16a. The combustion gas G then travels toward the exhaust port through the space around the evaporator 24 and the space around the second heat exchanger 42. A large portion of the heat of the combustion gas G produced in the discrete combustor 14a is removed by water flowing in the second heat exchanger 42. Therefore, when the operation of the discrete combustor 14b is stopped, the evaporator 24 is hardly heated. That is, also in the CHP system 105 according to the present modification, it is possible, when the Rankine cycle apparatus 20 is not in operation, to produce hot water in the second heat exchanger 42 while further ensuring the prevention of defects such as thermal damage to the evaporator 24.

The third heat exchanger 48 described in the second modification may be disposed in the internal space of the combustion chamber 12. In the present modification, another partition 80 is additionally provided between the evaporator 24 and the third heat exchanger 48. The combustion gas G produced in the discrete combustor 14b is supplied to the evaporator 24 through the first flow path 16a and its heat is removed in the evaporator 24, and then supplied to the third heat exchanger 48 through the space around the evaporator 24. Likewise, the combustion gas G produced in the discrete combustor 14a is supplied to the second heat exchanger 42 through the second flow path 16b and its heat is removed in the second heat exchanger 42, and then supplied to the third heat exchanger 48 through the space around the second heat exchanger 42. Thereafter, the combustion gas G flows from the outer circumferential portion of the helically formed third heat exchanger 48 toward the center thereof, and further travels toward the exhaust port of the combustion chamber 12.

The CHP system 106 including the above-described combustor 14 can also exert the same function and provide the same effects as the CHP system 104 and the CHP system 105 described with reference to FIG. 4 and FIG. 5.

Also in the CHP system 106 of the present modification, the first fluid circuit 30 is connected to the second fluid circuit 40 in series through the third heat exchanger 48, as in the CHP system 104 of the third modification. Also in the present modification, by control of the flow rate regulator 46, not only can all of the water heated in the first fluid circuit 30 be further heated in the second heat exchanger 42, but also only a portion of the water heated in the first fluid circuit 30 can be further heated in the second heat exchanger 42. Therefore, higher-temperature hot water can be produced as in the CHP systems 102 and 104 of the second and third modifications. The electrical output and the thermal output can be freely and finely adjusted on demand. In addition, by feeding an appropriate amount of the water to the second heat exchanger 42 when the Rankine cycle apparatus 20 is not in operation, it is possible to ensure the prevention of defects such as thermal damage to the evaporator 24 and an excessive increase in the internal pressure of the Rankine cycle apparatus 20. Furthermore, in the third heat exchanger 48, the remaining portion of the thermal energy of the combustion gas which has not been absorbed in the evaporator 24 and the second heat exchanger 42 can be recovered. Consequently, the efficiency of use of the thermal energy produced in the combustor 14 can be improved.

Other Modifications

It is not essential that the evaporator 24 be in contact with the second heat exchanger 42. The evaporator 24 may be spaced from the second heat exchanger 42. The evaporator 24 may be in indirect contact with the second heat exchanger 42 via a thermally-conductive member. The thermally-conductive member is a member that provides a thermal connection between the evaporator 24 and the second heat exchanger 42. An example of the thermally-conductive member is a heat pipe.

Figure 8A:
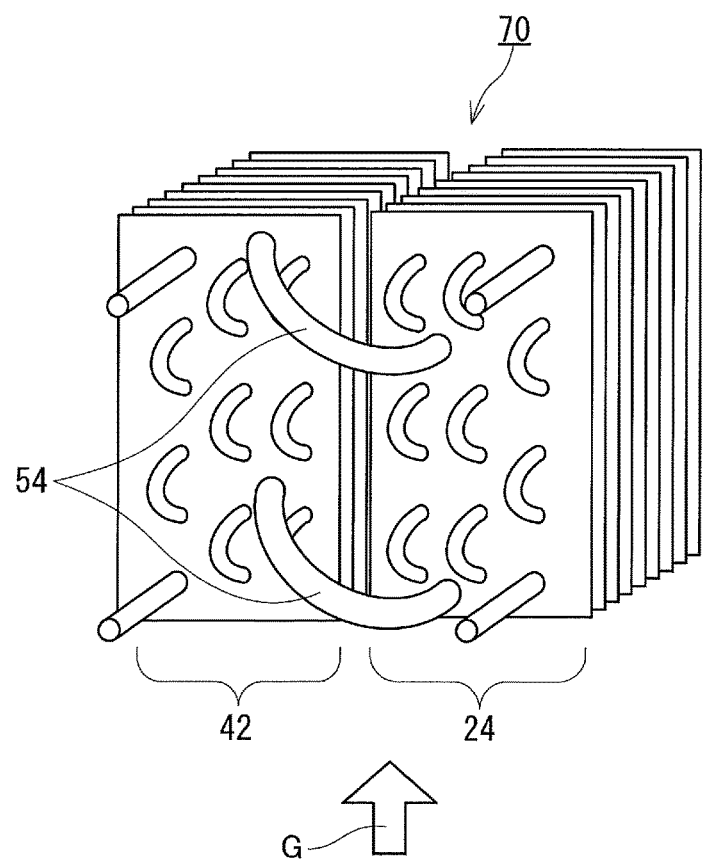
FIG. 8A is a perspective view of a heat exchange unit according to a modification.

A heat exchange unit 70 shown in FIG. 8A is formed of the evaporator 24, the second heat exchanger 42, and a heat pipe 54. In the heat exchange unit 70, the evaporator 24 is not in direct contact with the second heat exchanger 42. A gap of appropriate width is formed between a fin tube heat exchanger as the evaporator 24 and a fin tube heat exchanger as the second heat exchanger 42. The fins of the evaporator 24 are components different from the fins of the second heat exchanger 42. The heat pipe 54 that allows the evaporator 24 and the second heat exchanger 42 to be in indirect contact with each other is provided so that heat of the evaporator 24 is sufficiently transferred to the second heat exchanger 42. Such a heat pipe 54 is often used to facilitate heat transfer from one object to another. The heat pipe 54 can be composed of a pipe made of a material having high thermal conductivity and a volatile medium enclosed inside the pipe. By heating one end of the pipe and cooling the other end, the cycle of evaporation of the volatile medium and condensation of the medium is made to occur in the pipe. As a result, heat transfers from the one end to the other end of the pipe.

Figure 8B:
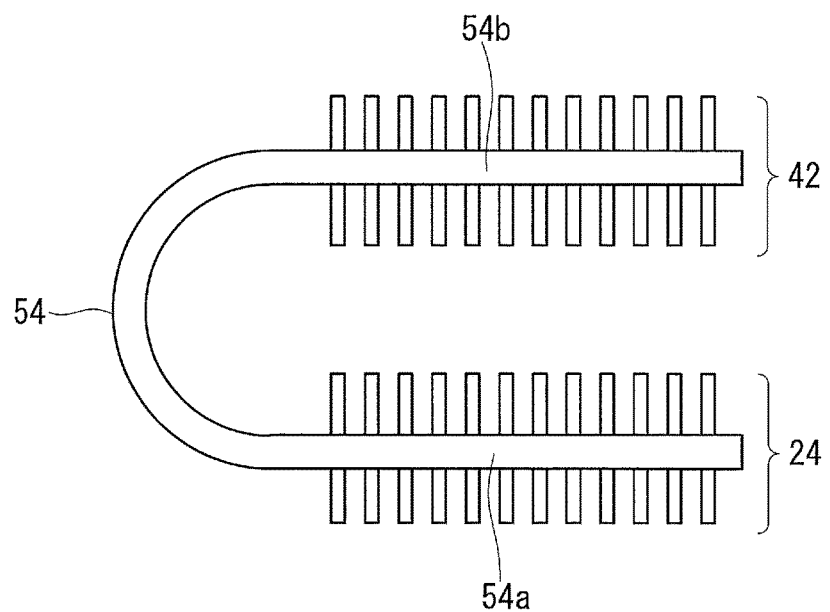
FIG. 8B is a schematic cross-sectional view of the heat exchange unit shown in FIG. 8A.

As shown in FIG. 8B, the heat pipe 54 has a heat absorption portion 54a and a heat release portion 54b. The heat absorption portion 54a and the heat release portion 54b are in direct contact with the evaporator 24 and the second heat exchanger 42, respectively. Specifically, the heat absorption portion 54a pierces through the fins of the evaporator 24, and thus the heat absorption portion 54a is fixed to the evaporator 24. The heat release portion 54b pierces through the fins of the second heat exchanger 42, and thus the heat release portion 54b is fixed to the second heat exchanger 42. With such a configuration, the heat transfer from the evaporator 24 to the second heat exchanger 42 can be facilitated.

Figure 8C:
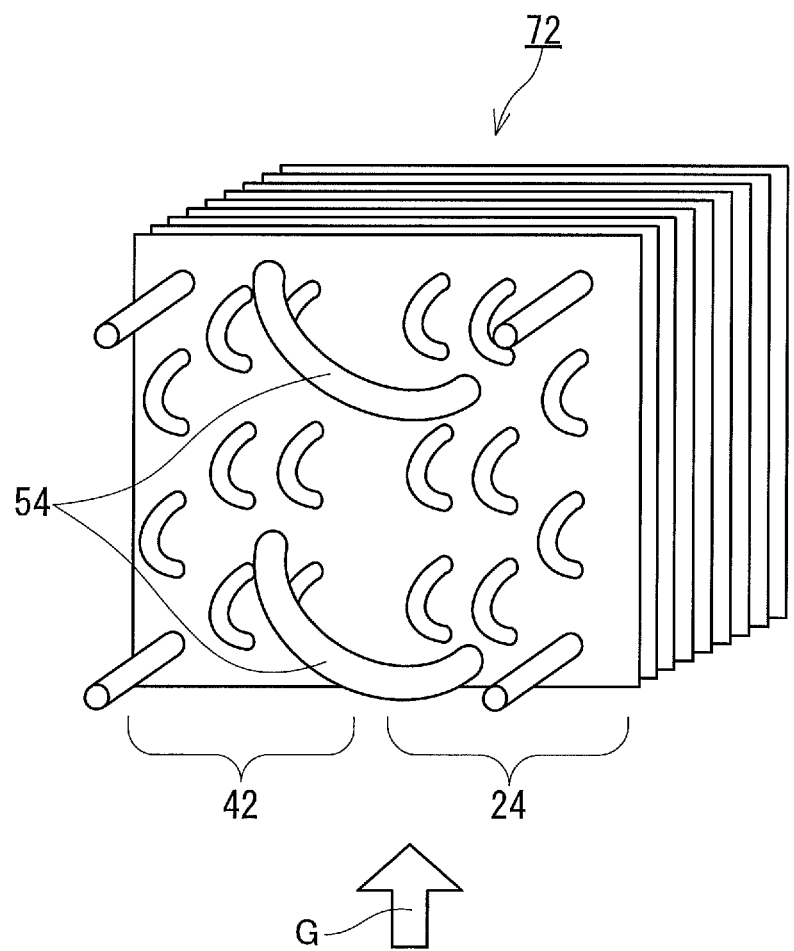
FIG. 8C is a perspective view of a heat exchange unit according to another modification.

Obviously, the heat pipe 54 can be used also when, as in a heat exchange unit 72 shown in FIG. 8C, the evaporator 24 is in direct contact with the second heat exchanger 42.

In the case where the plurality of discrete combustors 14a, 14b, and 14c are used as in the CHP system 104 described with reference to FIG. 4, it is possible to selectively supply thermal energy only to the second heat exchanger 42 while substantially blocking the supply of thermal energy to the evaporator 24. In this case, a thermally-conductive member like the heat pipe 54 may be omitted.

The invention may be embodied in other forms without departing from the spirit or essential characteristics thereof. The embodiments disclosed in this specification are to be considered in all respects as illustrative and not limiting. The scope of the disclosure is indicated by the appended claims rather than by the foregoing description, and all changes which come within the meaning and range of equivalency of the claims are intended to be embraced therein.

INDUSTRIAL APPLICABILITY

The CHP systems disclosed in the present specification can efficiently heat a heat medium such as water even when the Rankine cycle apparatus is not in operation. Such CHP systems are particularly suitable for use in cold regions where it is customary to produce hot water for indoor heating by a boiler. That is, indoor heating can be continued even when the Rankine cycle apparatus gets out of order for some reason.

The present disclosure may be embodied in other forms without departing from the spirit or essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

What is claimed is:

1. A combined heat and power system comprising:
    a heat source;
    a Rankine cycle apparatus comprising, as an evaporator for heating a working fluid, a first heat exchanger that absorbs thermal energy from a thermal fluid produced in the heat source;
    a fluid circuit comprising:
        a second heat exchanger, as a heat exchanger for heating a heat medium different from the working fluid of the Rankine cycle apparatus, that absorbs thermal energy from the thermal fluid and transfers the thermal energy to the heat medium,
        a first pipe connected to the second heat exchanger that delivers the heat medium to the second heat exchanger, and
        a second pipe connected to the second heat exchanger that delivers the heat medium heated by the second heat exchanger to an outside; and
    a thermal fluid flow path in which the first heat exchanger and the second heat exchanger are disposed so that the thermal fluid is supplied from the heat source to the first heat exchanger and the second heat exchanger respectively, wherein
    the working fluid is an organic working fluid, and
    the thermal fluid flow path comprises:

a first flow path that allows the thermal fluid to reach the first heat exchanger directly from the heat source, the first flow path being formed by a space between the heat source and the first heat exchanger, and the first heat exchanger directly facing the heat source across the first flow path, and a second flow path that allows the thermal fluid to reach the second heat exchanger directly from the heat source, the second flow path being formed by a space between the heat source and the second heat exchanger, and the second heat exchanger directly facing the heat source across the second flow path.

2. The combined heat and power system according to claim 1, wherein when the first heat exchanger and the second heat exchanger are orthogonally projected onto a plane of projection perpendicular to a flow direction of the thermal fluid in the thermal fluid flow path, a projected image of the first heat exchanger and a projected image of the second heat exchanger do not overlap each other on the plane of projection.

3. The combined heat and power system according to claim 1, wherein the thermal fluid can reach the second heat exchanger from the heat source without passing through the first heat exchanger, and the thermal fluid can reach the first heat exchanger from the heat source without passing through the second heat exchanger.

4. The combined heat and power system according to claim 1, wherein the second heat exchanger is in direct contact with the first heat exchanger or is in indirect contact with the first heat exchanger via a thermally-conductive member.

5. The combined heat and power system according to claim 1, wherein
the heat source comprises a plurality of discrete heat sources capable of producing the thermal fluid independently of each other, and
at least one of the discrete heat sources can supply the thermal fluid substantially only to the second heat exchanger.

6. The combined heat and power system according to claim 5, wherein a partition is provided between the first heat exchanger and the second heat exchanger.

7. The combined heat and power system according to claim 1, wherein
the heat source is a combustor that produces flame and combustion gas as the thermal fluid, and
the thermal fluid flow path is formed by an internal space of a combustion chamber containing the combustor.

8. The combined heat and power system according to claim 1, further comprising:
a flow path which includes the first pipe connected to the second heat exchanger, the flow path being configured to feed the heat medium to the second heat exchanger; and
a flow rate regulator disposed in the flow path.

9. The combined heat and power system according to claim 8, wherein
the Rankine cycle apparatus comprises a detector that detects an amount of generated electricity, and
the combined heat and power system further comprises a controller that controls the flow rate regulator based on the amount of generated electricity detected by the detector.

10. The combined heat and power system according to claim 1, wherein the combined heat and power system is capable of heating the heat medium by feeding the heat medium to the second heat exchanger when the Rankine cycle apparatus is not generating electricity.

11. The combined heat and power system according to claim 1, further comprising:
a third heat exchanger located farther from the heat source than the first heat exchanger and the second heat exchanger, wherein
the third heat exchanger transfers the thermal energy of the thermal fluid to the heat medium.

12. The combined heat and power system according to claim 11, wherein the third heat exchanger is connected to the second heat exchanger so that the heat medium having passed through the third heat exchanger flows into the second heat exchanger.

13. The combined heat and power system according to claim 4, wherein the thermally-conductive member is a heat pipe that allows the first heat exchanger and the second heat exchanger to be in indirect contact with each other.

14. The combined heat and power system according to claim 1, wherein
the Rankine cycle apparatus further comprises:
a pump that pressurizes the working fluid and delivers the pressurized working fluid to the evaporator, and
an expander, the working fluid flowing from the evaporator and into the expander, and
in a period after being discharged by the pump and before flowing into the expander, the working fluid has only been heated by absorbing thermal energy from the thermal fluid.

15. A combined heat and power system comprising:
a heat source;
a Rankine cycle apparatus comprising, as an evaporator for heating a working fluid, a first heat exchanger that absorbs thermal energy from a thermal fluid produced in the heat source;
a second heat exchanger, as a heat exchanger for heating a heat medium different from the working fluid of the Rankine cycle apparatus, that absorbs thermal energy from the thermal fluid and transfers the thermal energy to the heat medium; and
a thermal fluid flow path in which the first heat exchanger and the second heat exchanger are disposed so that the thermal fluid is supplied from the heat source to the first heat exchanger and the second heat exchanger respectively, wherein
the working fluid is an organic working fluid,
the thermal fluid flow path comprises a first flow path that allows the thermal fluid to reach the first heat exchanger directly from the heat source and a second flow path that allows the thermal fluid to reach the second heat exchanger directly from the heat source,
the second heat exchanger is in direct contact with the first heat exchanger or is in indirect contact with the first heat exchanger via a thermally-conductive member, and
the thermally-conductive member is a heat pipe that allows the first heat exchanger and the second heat exchanger to be in indirect contact with each other.

* * * * *